Patented June 9, 1953

2,641,594

UNITED STATES PATENT OFFICE 2,641,594

VINYLIDENE BIS(HYDROCARBON SULFONES) AND THEIR POLYMERS

Arthur L. Barney, Wilmington, Del., assignor to E. I. du Pont de Nemours and Company, Wilmington, Del., a corporation of Delaware No Drawing. Application May 16, 1951, Serial No. 226,747

23 Claims. (Cl. 260—79.3)

This invention relates to new compositions of matter and to their preparation. More particularly, this invention relates to new monomeric unsaturated sulfones, to their preparation and to polymers thereof.

Unsaturated sulfones of various types have been described in the literature. However, unsaturated sulfones having two sulfonyl groups attached to the same unsaturated carbon atom have not hitherto been known. Such sulfones are desirable for certain applications because of the particular properties imparted by the two sulfonyl groups attached to the same carbon atom.

It is an object of this invention to provide new and useful compositions of matter. A further object is to provide a new class of unsaturated sulfones and polymers thereof. Another object is to provide new unsaturated sulfones having two sulfonyl groups attached to the same unsaturated carbon atom. An additional object is to provide a novel method of preparing the new unsaturated sulfones of this invention. Other objects will appear hereinafter.

The objects of this invention are accomplished by providing new chemical compounds, the vinylidene bis(hydrocarbon sulfones) and their polymers. The vinylidene bis(hydrocarbon sulfones) of this invention have the general formula

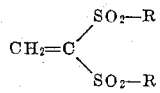

wherein the R's are monovalent hydrocarbon radicals directly joined to the sulfur atoms of the sulfonic radicals or are divalent alkylene radicals joined together to form a ring with the sulfur atoms to which they are directly attached.

The vinylidene bis(hydrocarbon sulfones) of this invention are prepared by a novel process which comprises reacting a methylene bis(hydrocarbon sulfone) with formaldehyde in the presence of an alkaline catalyst, separating the resulting 1,1,3,3-tetrakis(hydrocarbonsulfonyl)-propane from the reaction mixture, then heating, preferably at reduced pressure, said 1,1,3,3-tetrakis(hydrocarbonsulfonyl)propane in the presence of an acidic catalyst, and removing by distillation from the reaction mixture the vinylidene bis(hydrocarbon sulfone) as it is formed therein.

This invention also provides novel polymeric products which are obtained by polymerizing the new vinylidene bis(hydrocarbon sulfones) and includes homopolymers as well as copolymers of the vinylidene bis(hydrocarbon sulfones) with another ethylenically unsaturated compound capable of addition polymerization.

A convenient way of carrying out the process of this invention is as follows: The first step consists in adding to a mixture of a methylene bis(hydrocarbon sulfone), e. g., methylene bis-(ethyl sulfone) and formaldehyde in a solvent, e. g., water or methanol, an amount of an alkaline material, e. g., potassium hydroxide or sodium carbonate, sufficient to make the reaction mixture alkaline. The form and the proportions of formaldehyde are not critical. Paraformaldehyde or aqueous formaldehyde of 37% concentration are operable. Satisfactory results are obtained when 1 mole of formaldehyde is used for 2 moles of the hydrocarbon sulfone. However, an excess of either the sulfone or formaldehyde can be used if desired. The addition of the catalyst to the solution of formaldehyde and the methylene bis-sulfone causes reaction to begin immediately and the heat of the reaction may cause the reaction mixture to boil. After the exothermic reaction begins to subside, external heat is applied to continue the reaction mixture at reflux temperature to complete the reaction. While it is convenient to carry out the reaction at reflux temperature, it can also be done at any temperature between room temperature or lower and the boiling point of the mixture, or even higher under superatmospheric pressure. The reaction mixture is then cooled whereupon the 1,1,3,3-tetrakis(hydrocarbonsulfonyl)propane crystallizes from the reaction mixture. The crude product is suitable for use in the next step of the process without further purification. The mother liquor from the crystallization can be used again as the reaction medium for the further condensation of formaldehyde with the methylene bis(hydrocarbon sulfone).

In the second step of this process, a mixture of the 1,1,3,3-tetrakis(hydrocarbonsulfonyl)propane and from 5 to 100% or more of an acidic catalyst, e. g., 75 to 100% or more of zinc chloride based on the weight of the sulfone, is heated at reduced pressure to a temperature of at least 100° C. and, preferably, between 150° and 250° C. in a reaction vessel fitted with a distillation head so that the resulting vinylidene bis(hydrocarbon sulfone) can be removed from the reaction mixture as soon as it is formed. Temperatures above 250° C. are not desirable since some decomposition takes place at such temperatures. The exact pressure under which the reaction is conducted is not critical but should be low enough to keep the temperature of the reaction mixture within the range of 100° to 250° C. and still permit the distillation of the product. The preferred pressure will thus be seen to depend on the boiling point of the particular vinylidene bis(hydrocarbon sulfone) being prepared. The vinylidene bis(hydrocarbon sulfone) is separated from the accompanying methylene bis(hydrocarbon sulfone) in the distillate by fractional crystallization, e. g., by crystallization from a solvent such as carbon tetrachloride.

The process of this invention is illustrated by the following equations showing the preparation of vinylidene bis(ethyl sulfone).

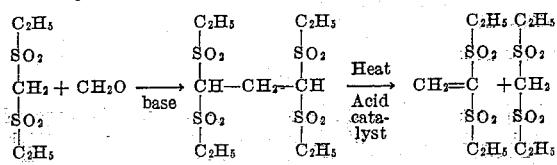

The polymers of this invention can be prepared by contacting a composition containing the vinylidene bis(hydrocarbon sulfone) with an addition type polymerization initiator, e. g., a free radical-generating initiator, such as a peroxy compound or an azo compound of the type described in U. S. Patent 2,471,959, at a temperature between 0° and 150° C. When the polymerization mixture contains, in addition to the vinylidene bis(hydrocarbon sulfone), another ethylenically unsaturated compound capable of addition polymerization, the composition should contain at least 10% of vinylidene bis(hydrocarbon sulfone). The polymerization can be carried out by conventional bulk or solution methods of polymerization.

The methylene bis(hydrocarbon sulfones) used as starting materials in the process of this invention can be prepared by known methods. For example, methylene bis(ethyl sulfone) can be prepared from ethanethiol by reaction with formaldehyde followed by oxidation with a peroxide or a permanganate.

This invention is further illustrated by the following examples in which the proportions of ingredients are expressed in parts by weight, unless otherwise noted.

*Example I*

A mixture of 67 parts of methylene bis(ethyl sulfone) and 30 parts of 37% aqueous formaldehyde solution in 158 parts of methanol is heated to 50 to 60° C. and made alkaline with 1 part of potassium hydroxide. An exothermic reaction immediately ensues, causing the solution to boil vigorously for a few minutes. After a total of about five minutes at 60 to 70° C. the resulting mixture is cooled to room temperature to complete the crystallization of the reaction product, whereupon the product is separated by filtration. This preparation is repeated twice, using the mother liquor from the previous crystallization as reaction medium for the subsequent run. There is obtained from the three runs 215.5 parts of slightly wet product, which is a nearly theoretical yield of 1,1,3,3-tetrakis(ethylsulfonyl)-propane, melting at 151 to 153° C. (melting point given in the literature is 154° C.).

A mixture of 40 parts of the 1,1,3,3-tetrakis-(ethylsulfonyl)propane prepared as described above and 20 parts of zinc chloride is heated under vacuum (approximately 3 mm. mercury pressure) under a distilling head at a temperature of 200–220° C. During a reaction time of about 30 minutes, 15 parts of a water-white product, which crystallizes in the receiver, distills at 165–170° C. at 3 mm. pressure. The crystalline product, melting at 49–50° C., is dissolved in boiling carbon tetrachloride. On cooling to room temperature, about 6 parts of solid material, melting at 98–101° C., precipitates out. Recrystallization of this solid from methanol gives 5.5 parts of methylene bis(ethyl sulfone) melting at 100–102° C. The melting point is unchanged on admixture with an authentic sample of methylene bis(ethyl sulfone). This material is further identified by reconversion with formaldehyde to 1,1,3,3 - tetrakis(ethylsulfonyl)propane, and by elementary analysis.

| Found | Calcd. for $CH_2(SO_2C_2H_5)_2$ |
|---|---|
| Percent C, 30.63 | 30.0 |
| Percent H, 6.16 | 6.0 |
| Percent S, 31.50, 31.54 | 32.0 |

Evaporation of the carbon tetrachloride solution obtained as a filtrate in the procedure described in the preceding paragraph gives approximately 9 parts of a slowly crystallizing product. Recrystallization from anhydrous ethyl ether yields 8 parts of vinylidene bis(ethyl sulfone) melting at 73–75° C. and identified by analysis:

| Found | Calcd. for $CH_2=C(SO_2C_2H_5)_2$ |
|---|---|
| Percent C, 33.24 | 33.96 |
| Percent H, 5.68 | 5.49 |
| Percent S, 30.23, 30.36 | 30.18 |

The infrared absorption spectrum obtained for vinylidene bis(ethyl sulfone) showed absorption bands characteristic of sulfone groups, carbon to carbon double bonds, and of hydrogen atoms on a carbon atom with a double bond. The product vinylidene bis(ethyl sulfone) also reduces aqueous potassium permanganate solution readily at room temperature.

*Example II*

A mixture of 40 parts of 1,1,3,3-tetrakis(ethylsulfonyl)propane, prepared as described in the preceding example, and 40 parts of zinc chloride is pyrolyzed under the same conditions as described in Example I. There is isolated by the procedure used in the preceding example 14 parts of vinylidene bis(ethyl sulfone).

*Example III*

A solution of 2 parts of vinylidene bis(ethyl sulfone), 2 parts of styrene and 0.04 part of benzoyl peroxide in 3.5 parts of thiophene-free benzene is heated at 80–85° C. for 18 hours. The resulting solution is poured into methanol and the polymeric product precipitates. After drying there is obtained 1.1 parts of a polymer of vinylidene bis(ethyl sulfone) containing 14.42% sulfur. This indicates that the polymer contains 47% of vinylidene bis(ethyl sulfone). This polymer may be pressed at 100–140° C. into water-white films.

*Example IV*

In another polymerization carried out in the same manner as Example III, a mixture of 2 parts of vinylidene bis(ethyl sulfone), 2 parts of methyl acrylate, and 0.04 part of azobis(alpha,- gamma,gamma - trimethylvaleronitrile) in 3.5 parts of thiophene-free benzene is polymerized for 18 hours at 25° C. The resulting solution is poured into diethyl ether and the polymeric product precipitates. After drying there is obtained 1.4 parts of a polymer of vinylidene bis(ethyl sulfone) containing 7.86% sulfur, corresponding to a vinylidene bis(ethyl sulfone) content of 26%. This polymer is also capable of being pressed into water-white films at 100–140° C.

*Example V*

A mixture of 2 parts of vinylidene bis(ethyl sulfone), 2 parts of acrylonitrile, 0.04 part of azobis(alpha,gamma,gamma - trimethylvaleronitrile) in 3.5 parts of thiophene-free benzene is polymerized at 25° C. for 18 hours. The resulting polymeric product which separates during the polymerization is filtered and then washed with methanol. After drying there is obtained 1.5 parts of a polymer containing 3.19% sulfur. This indicates that the resulting polymer of vinylidene bis(ethyl sulfone) contains 10% by weight of the sulfone.

*Example VI*

A solution of 2 parts of vinylidene bis(ethyl sulfone), 2 parts of vinyl acetate and 0.04 part of azobis(alpha,gamma,gamma - trimethylvaleronitrile) in 3.5 parts of thiophene-free benzene is polymerized at 25° C. for 18 hours. The resulting solution is poured into diethyl ether to precipitate the polymer. The resulting polymer, after drying, amounts to 0.6 part and contains 21.66% sulfur. This sulfur content indicates that the polymer of vinylidene bis(ethyl sulfone) contains 72% of the vinylidene sulfone. This polymer can be pressed at 100–140° C. into water-white films.

*Example VII*

A solution of 3 parts of vinylidene bis(ethyl sulfone), 3 parts of methyl methacrylate and 0.05 part of benzoyl peroxide in 10 parts of benzene is heated at 80° C. for 18 hours. At the end of this time the reaction mixture is poured into methanol to precipitate the polymer. The resulting polymer, after drying, amounts to 2.2 parts and contains 1.4% sulfur. This indicates that the polymer of vinylidene bis(ethyl sulfone) contains 5% of the sulfone. This polymer has an inherent viscosity, measured at 0.2% concentration in chloroform at 25° C., of 0.22.

*Example VIII*

A mixture of 2 parts of vinylidene bis(ethyl sulfone) and 0.04 part of di-tertiary butyl peroxide is heated under an atmosphere of nitrogen. A vigorous reaction ensues as soon as the temperature reaches 125° C. The temperature is maintained at 125° C. for 30 minutes and the reaction mixture then cooled to room temperature. The originally crystalline ether-soluble monomer is converted to a heavy, dark, oily polymer of vinylidene bis(ethyl sulfone) which is not readily soluble in ether.

*Example IX*

A solution of 3.5 parts of isoprene, 3.5 parts of vinylidene bis(ethyl sulfone), 8 parts of thiophene-free benzene, and 0.1 part of azobis(alpha,gamma,gamma-trimethylvaleronitrile) is polymerized under nitrogen at 25° C. for 24 hours. A solid polymer gel is obtained. The gel is broken up in methanol, washed with methanol and dried to 4 parts of a white polymeric powder which can be pressed to a water-white film at 100–140° C. The polymer contains 21.5% sulfur, corresponding to a vinylidene sulfone content of 63%. It has an inherent viscosity of 0.32 (0.2% in chloroform, 25° C.).

In similar experiments employing isoprene/vinylidene bis(ethyl sulfone) monomer ratios of 75/25 and 25/75 (by weight) similar polymers are obtained in conversions of 17 and 65%, respectively. The products can be pressed into water-white films, and have inherent viscosities (0.2% in chloroform, 25° C.) of 0.17 and 0.29, respectively. Sulfur analyses indicate vinylidene bis(ethyl sulfone) contents of 52 and 67%, respectively, in these polymers.

The examples have illustrated the products of this invention by specific reference to monomeric vinylidene bis(ethyl sulfone) and to certain polymers of this vinylidene sulfone. However, the invention is generic to all vinylidene bis(hydrocarbon sulfones) and their polymers. The hydrocarbon radical in these sulfones can be aliphatic, cycloaliphatic, aromatic or araliphatic. These monomeric vinylidene bis(hydrocarbon sulfones) can all be prepared from the corresponding methylene bis(hydrocarbon sulfones). Specific examples of such methylene bis(hydrocarbon sulfones) are methylene bis(methyl sulfone), methylene bis(n-butyl sulfone), methylene bis(n-octyl sulfone), methylene bis(cyclohexyl sulfone), methylene bis(phenyl sulfone) and methylene bis(benzyl sulfone). The methylene bis(alkyl sulfones) are preferred for use in this invention. Specific examples of the 1,1,3,3-tetrakis(hydrocarbon sulfonyl)propanes employed in the second step of the process of this invention are 1,1,3,3-tetrakis(methylsulfonyl)propane, 1,1,3,3-tetrakis(n - butylsulfonyl)propane, 1,1,3,3-tetrakis(n - octylsulfonyl)propane, 1,1,3,3-tetrakis(cyclohexylsulfonyl)propane, 1,1,3,3-tetrakis(phenylsulfonyl)propane and 1,1,3,3-tetrakis(benzylsulfonyl)propane. In these 1,1,3,3-tetrakis(hydrocarbon sulfonyl)propanes, the hydrocarbon radical in each hydrocarbon sulfonyl group is free from aliphatic unsaturation. The 1,1,3,3-tetrakis(alkylsulfonyl)propanes are preferred.

Specific examples of other monomeric vinylidene sulfones of this invention include vinylidene bis(methyl sulfone), vinylidene bis(n-butyl sulfone), vinylidene bis(n-octyl sulfone), vinylidene bis(cyclohexylsulfone), vinylidene bis(phenyl sulfone) and vinylidene bis(benzyl sulfone). The hydrocarbon radical of these vinylidene bis(hydrocarbon sulfones) is free from aliphatic unsaturation and may be joined to form a ring, e. g., 2-methylene-1,3-dithiolane-1,1,3,3-tetroxide. Vinylidene bis(hydrocarbon sulfones) in which the hydrocarbon radical is an aliphatic radical of 1 to 8 carbons are preferred and, of these, the vinylidene bis(alkyl sulfones) are particularly preferred of which vinylidene bis(methyl sulfone) and vinylidene bis(ethyl sulfone) are especially useful.

The polymers of this invention contain at least 5% by weight of combined vinylidene bis(hydrocarbon sulfone), and they are prepared from monomeric compositions containing at least 10% by weight of the vinylidene bis(hydrocarbon sulfone). In addition to the specific polymerization systems illustrated by the examples, the polymerization systems can contain other ethylenically unsaturated compounds capable of addition polymerization, particularly ethylenically unsaturated compounds in which the ethylene unsaturation is the sole aliphatic carbon-tocarbon unsaturation and consists of from 1 to 2 double bonds, such as, for example, ethylene, isobutylene, ethyl acrylate, isobutyl methacrylate, methacrylonitrile, vinyl propionate, vinyl chloride, vinylidene chloride, tetrafluoroethylene, chlorotrifluoroethylene, vinyl sulfonic acid, vinyl esters of hydrocarbon sulfonic acids, 1,3-dienes such as butadiene and chloroprene, and the like. The presence of as little as 5% of another ethylenically unsaturated comonomer in the copolymer of vinylidene bis(hydrocarbon sulfone) causes a significant change in the properties of the polymer of vinylidene bis(hydrocarbon sulfone).

As indicated previously, the first step of the process of this invention, i. e., the condensation of formaldehyde with a methylene bis(hydrocarbon sulfone) is catalyzed by alkaline materials. In addition to the sodium hydroxide of the examples, other alkaline materials such as potassium hydroxide, sodium and potassium carbonates, and sodium acetate are operable. The amount of alkaline material required is not critical, but should be used in an amount sufficient to produce an alkaline reaction in the reaction mixture. For this purpose, amounts ranging from 0.5% to 5% are useful. When alkaline catalysts are used, it is preferable to use an inert solvent such as water or a lower aliphatic alcohol such as methanol or ethanol.

Zinc chloride is especially suitable as the catalyst in the second step of this invention, i. e., the pyrolysis of the 1,1,3,3-tetrakis(hydrocarbon sulfonyl)-propane. The amount of zinc chloride can vary over wide ranges; amounts ranging from 5 to 100% or more of the weight of the sulfone are operable. Amounts of zinc chloride ranging from 75% to 100% or more of the sulfone are preferred since improved yields are obtained with this quantity. In addition to zinc chloride, other acidic materials catalyze the pyrolysis. Other specific acid catalysts include phosphorus pentoxide, phosphoric acid, aluminum sulfate, aluminum chloride, ferric chloride and mercuric chloride.

In addition to the use of the specific polymerization initiators mentioned in the examples, the monomeric vinylidene bis(hydrocarbon sulfones) of this invention can be polymerized by means of actinic light, peroxy compounds, e. g., potassium persulfate, benzoyl peroxide, t-butyl hydroperoxide, diethyl peroxide, and the like; and the azo initiators such as those disclosed in U. S. Patent 2,471,959, e. g., alpha,alpha'-azodiisobutyronitrile, alpha,alpha'-azodiisobutyramide, alpha,alpha' - azobis(alpha,gamma - dimethylvaleronitrile), and the like. The initiator concentrations which are operable range from 0.01 to 10% of the weight of the monomer. The polymerization can be carried out at temperatures ranging from 0° to 150° C. In general, the specific temperature employed in any specific case depends on the particular initiator being employed.

As has been shown, the monomeric vinylidene bis(hydrocarbon sulfones) of this invention can be converted to polymers which are useful as adhesives, as components of coating compositions, and as self-supporting films. Their polymerizability is contrasted sharply with the behavior of the isomeric 1,2-ethylene bis(hydrocarbon sulfones) which have not been found susceptible to polymerization.

As many apparently widely different embodiments of this invention may be made without departing from the spirit and scope thereof, it is to be understood that this invention is not limited to the specific embodiments thereof except as defined in the appended claims.

I claim:

1. A vinylidene bis(hydrocarbon sulfone) in which the hydrocarbon radical in each hydrocarbon sulfone group is free from aliphatic unsaturation.

2. The chemical compound, vinylidene bis-(ethyl sulfone).

3. A polymer of a vinylidene bis(hydrocarbon sulfone), in which the hydrocarbon radical in each hydrocarbon sulfone group is free from aliphatic unsaturation.

4. A polymer of vinylidene bis(ethyl sulfone).

5. A homopolymer of a vinylidene bis(hydrocarbon sulfone), in which the hydrocarbon radical in each hydrocarbon sulfone group is free from aliphatic unsaturation.

6. A homopolymer of vinylidene bis(ethyl sulfone).

7. A copolymer of a vinylidene bis(hydrocarbon sulfone) in which the hydrocarbon radical in each hydrocarbon sulfone group is free from aliphatic unsaturation and an ethylenically unsaturated compound capable of addition polymerization, said vinylidene bis(hydrocarbon sulfone) being at least 5% by weight of said copolymer.

8. A copolymer of vinylidene bis(ethyl sulfone) and an ethylenically unsaturated compound capable of addition polymerization, said vinylidene bis(ethyl sulfone) being at least 5% by weight of said copolymer.

9. A copolymer of vinylidene bis(ethyl sulfone) and styrene, said vinylidene bis(ethyl sulfone) being at least 5% by weight of said copolymer.

10. A copolymer of vinylidene bis(ethyl sulfone) and a monomer selected from the group consisting of acrylonitrile, methyl acrylate and methyl methacrylate, said vinylidene bis(ethyl sulfone) being at least 5% by weight of said copolymer.

11. A copolymer of vinylidene bis(ethyl sulfone) and acrylonitrile, said vinylidene bis(ethyl sulfone) being at least 5% by weight of said copolymer.

12. A copolymer of vinylidene bis(ethyl sulfone) and vinyl acetate, said vinylidene bis(ethyl sulfone) being at least 5% by weight of said copolymer.

13. A copolymer of vinylidene bis(ethyl sulfone) and a 1,3-diene, said vinylidene bis(ethyl sulfone) being at least 5% by weight of said copolymer.

14. A process for the preparation of vinylidene bis(ethyl sulfone) which comprises heating 1,1,3,3-tetrakis(ethylsulfonyl)propane in the presence of an acidic catalyst and removing by distillation from the reaction mixture the vinylidene bis(ethyl sulfone) as it is formed therein.

15. A vinylidene bis(alkyl sulfone).

16. A polymer of a vinylidene bis(alkyl sulfone).

17. A homopolymer of a vinylidene bis(alkyl sulfone).

18. A copolymer of a vinylidene bis(alkyl sulfone) and an ethylenically unsaturated compound capable of addition polymerization, said vinylidene bis(alkyl sulfone) being at least 5% by weight of said copolymer.

19. A copolymer of a vinylidene bis(alkyl sulfone) and a 1,3-diene, said vinylidene bis(alkyl sulfone) being at least 5% by weight of said copolymer.

20. A copolymer of a vinylidene bis(alkyl sulfone) and isoprene, said vinylidene bis(alkyl sulfone) being at least 5% by weight of said copolymer.

21. A copolymer of vinylidene bis(ethyl sulfone) and isoprene, said vinylidene bis(ethyl sulfone) being at least 5% by weight of said copolymer.

22. A process for the preparation of a vinylidene bis(hydrocarbon sulfone) in which the hydrocarbon radical in each hydrocarbon sulfone group is free from aliphatic unsaturation, which comprises heating in the presence of an acidic catalyst a 1,1,3,3-tetrakis(hydrocarbon sulfonyl)-propane in which the hydrocarbon radical in each hydrocarbon sulfonyl group is free from aliphatic unsaturation, and removing by distillation from the reaction mixture the vinylidene bis(hydrocarbon sulfone) as it is formed therein.

23. A process for the preparation of a vinylidene bis(alkyl sulfone) which comprises heating a 1,1,3,3-tetrakis(alkyl sulfonyl)propane in the presence of an acidic catalyst, and removing by distillation from the reaction mixture the vinylidene bis(alkyl sulfone) as it is formed therein.

ARTHUR L. BARNEY.

References Cited in the file of this patent

UNITED STATES PATENTS

| Number | Name | Date |
|---|---|---|
| 2,493,364 | Schoene | Jan. 3, 1950 |
| 2,535,533 | Evans | Dec. 26, 1950 |

OTHER REFERENCES

Fromm et al. Berichte, vol. 56B, pages 2290-4 (1923).